(12) United States Patent
Pan et al.

(10) Patent No.: US 8,089,730 B1
(45) Date of Patent: Jan. 3, 2012

(54) SUSPENSION ASSEMBLY HAVING A READ HEAD CLAMP

(75) Inventors: Tzong-Shii Pan, San Jose, CA (US); Gunphai Prateepphaisan, Ayutthaya (TH)

(73) Assignee: Western Digital (Fremont), LLC, Fremont, CA (US)

( * ) Notice: Subject to any disclaimer, the term of this patent is extended or adjusted under 35 U.S.C. 154(b) by 274 days.

(21) Appl. No.: 12/607,891

(22) Filed: Oct. 28, 2009

(51) Int. Cl.
*G11B 21/21* (2006.01)
(52) U.S. Cl. .................................... 360/244.8
(58) Field of Classification Search ............... 360/244.8, 360/245.3, 245.6, 245.9
See application file for complete search history.

(56) References Cited

U.S. PATENT DOCUMENTS

| | | | |
|---|---|---|---|
| 6,459,260 B1 * | 10/2002 | Bonin et al. | 324/750.25 |
| 6,903,543 B2 * | 6/2005 | Boutaghou et al. | 324/756.02 |
| 6,943,971 B2 * | 9/2005 | Kainuma et al. | 360/31 |
| 7,165,462 B2 | 1/2007 | Luo et al. | |
| 7,355,393 B2 | 4/2008 | Tokutomi et al. | |
| 7,368,905 B2 | 5/2008 | Grinberg et al. | |
| 7,453,670 B2 * | 11/2008 | Takanuki et al. | 360/254.3 |
| 7,471,081 B2 | 12/2008 | Kainuma et al. | |
| 7,497,006 B2 | 3/2009 | Davis et al. | |
| 7,719,796 B2 * | 5/2010 | Takahashi et al. | 360/244.8 |
| 2006/0112770 A1 | 6/2006 | Luo et al. | |
| 2006/0236527 A1 | 10/2006 | Davis et al. | |
| 2007/0046286 A1 | 3/2007 | Umezaki et al. | |
| 2007/0263325 A1 | 11/2007 | Hanya et al. | |
| 2009/0251825 A1 * | 10/2009 | Honzawa et al. | 360/245.3 |

* cited by examiner

*Primary Examiner* — Angel A. Castro

(57) ABSTRACT

A suspension assembly includes a read head clamp attached to a flexure that includes structural, dielectric, and conductive layers. The clamp includes a cantilevered clamping arm sized so that its distal end is positioned to contact a leading face of a read head. The clamp also includes a wall positioned to face a trailing face of the read head. Each of a plurality of conductive probes defined in the structural layer is electrically connected to a corresponding one of a plurality of conductive traces defined in the conductive layer, by a plurality of conductive vias through the dielectric layer. Each of the plurality of conductive probes is bent out of the flexure plane and is positioned to contact the trailing face of the read head. A method for temporarily holding a read head is also disclosed.

19 Claims, 7 Drawing Sheets

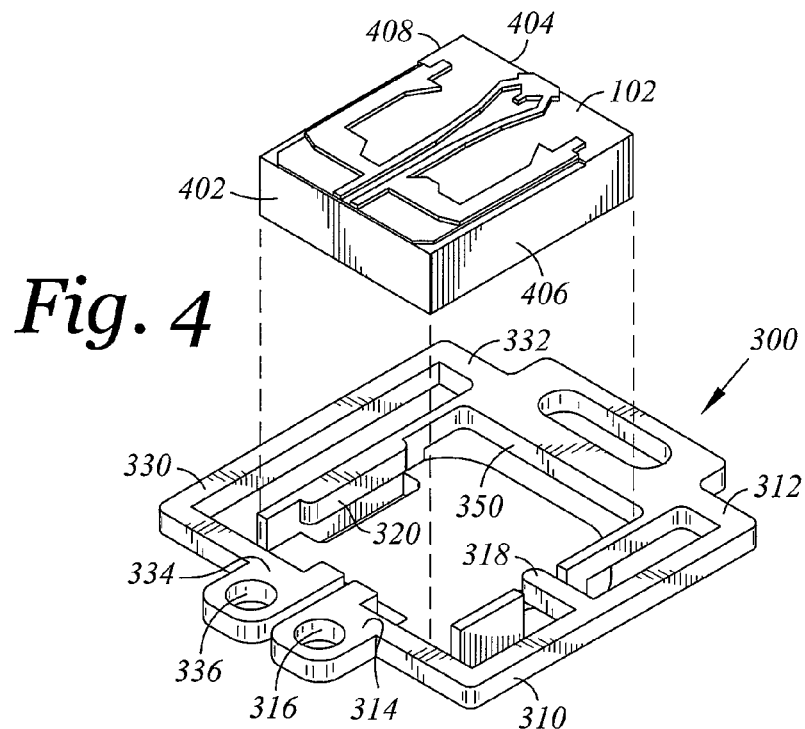
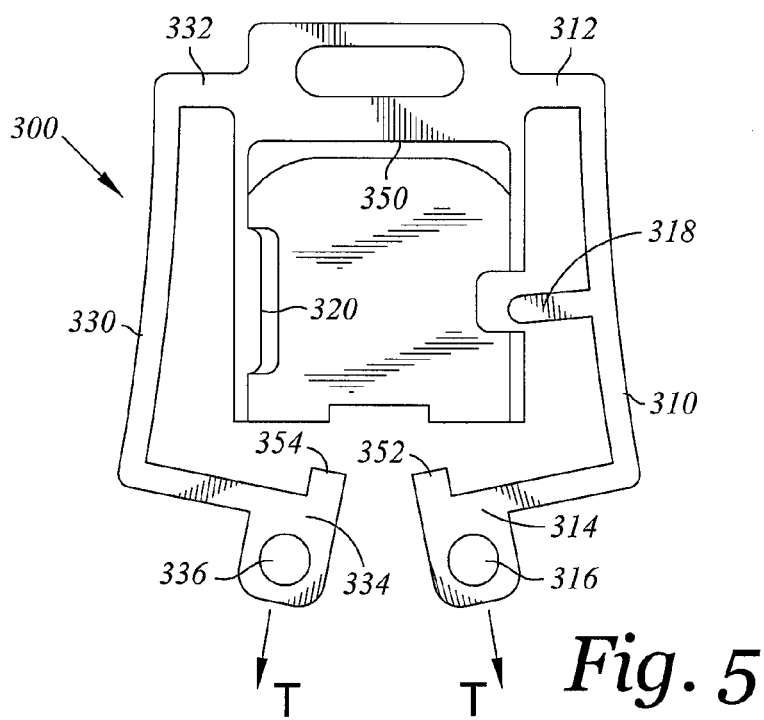

SUSPENSION ASSEMBLY HAVING A READ HEAD CLAMP

FIELD OF THE INVENTION

The present invention relates generally to information storage devices, and in particular to suspension assemblies used in the manufacture of disk drive information storage devices.

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. All of these types of heads will be referred to as "read heads" herein.

In a modern magnetic hard disk drive device, each read head is a sub-component of a head-gimbal assembly (HGA). The HGA also includes a suspension assembly for holding the read head and providing a plurality of electrical connections thereto. The suspension assembly typically includes a fragile laminated flexure to carry the electrical signals to and from the head. The HGA, in turn, is a sub-component of a head-stack assembly (HSA) that typically includes a plurality of HGAs, an actuator, and a flex cable. The plurality of HGAs are attached to various arms of the actuator, and each of the laminated flexures of the HGAs has a flexure tail that is electrically connected to the HSA's flex cable.

The read head is typically permanently bonded to a tongue portion of the fragile laminated flexure by an adhesive, for example by an epoxy adhesive. Accordingly, if it is discovered that the read head is faulty after HGA assembly, the suspension assembly will typically be wasted because typically the permanent bond cannot be broken without damaging the fragile laminated flexure.

Therefore, it may be desirable to test the function of the read head prior to HGA assembly, so that if the read head is determined to be faulty it may be discarded prior to permanent bonding to a suspension assembly. Such functional testing (e.g. so-called "dynamic electrical test" or "DET") is more accurate if the testing conditions more closely resemble the actual conditions during operation of the information storage device. For example, the accuracy of the functional testing may be improved by holding and electrically connecting the read head using a suspension assembly that is similar to the type of suspension assembly to which the read head will be bonded if its function is deemed acceptable.

US 2006/0236527 to Davis, et al., (hereinafter "Davis") discloses a suspension assembly for the purpose described above, that may be suitable for certain read heads. However, the design concept in Davis is difficult to scale to smaller read heads, for various reasons. For example, because the "slider engagement member" in Davis flexes in the vertical direction, it may not be suitable for read heads having reduced height, so that the Davis concept may be difficult to scale down for use with smaller read heads (e.g. so-called "femto" form-factor read heads are only 230 microns in height). Also for example, the "lead contact pads" in Davis must become smaller and closer together if the size of the read head is reduced, so that the force necessarily applied by the "slider engagement member" (to reliably hold the read head) may cause the "lead contact pads" to undesirably yield.

Accordingly, there is a need in the art for a suspension assembly that can practically temporarily hold and provide electrical connection to smaller read heads.

SUMMARY

A suspension assembly for holding a read head, and providing a plurality of electrical connections thereto, is disclosed. The suspension assembly includes a suspension mounting plate and a load beam attached to the suspension mounting plate. The suspension assembly also includes a laminated flexure comprising a structural layer, a conductive layer, and a dielectric layer disposed between the structural and conductive layers. The laminated flexure defines a body region, a tongue region, and at least two flexure beams. The tongue region defines a flexure plane. The body region is connected to the tongue region by the at least two flexure beams. The structural layer is attached to the load beam in the body region. A plurality of conductive traces is defined in the conductive layer. A read head clamp is attached to the tongue region of the laminated flexure. The read head clamp includes a first cantilevered clamping arm that has a first arm supported end and a first arm distal end. The first cantilevered clamping arm is sized so that the first arm distal end is positioned to contact a leading face of the read head. The read head clamp includes a first wall positioned to face a trailing face of the read head. The laminated flexure includes a plurality of conductive probes defined in the structural layer in the tongue region. Each of the plurality of conductive probes is electrically connected to a corresponding one of the plurality of conductive traces by a plurality of conductive vias through the dielectric layer. Each of the plurality of conductive probes is bent out of the flexure plane and is positioned to contact the trailing face of the read head.

A method for holding a read head, and providing a plurality of electrical connections thereto, is also disclosed. According to this method, the first and second arm distal ends include first and second tooling holes, respectively. First and second tooling pins are inserted in the first and second tooling holes, respectively. The first and second tooling pins are spread apart from each other, by relative translation that is substantially parallel to the flexure plane. The read head is placed between the first and second cantilevered clamping arms. The first and second tooling pins are removed from the first and second tooling holes, respectively, allowing the first and second distal ends to contact and push against a leading face of the read head, the trailing face of the read head contacting the plurality of conductive probes.

BRIEF DESCRIPTION OF THE DRAWINGS

FIG. 4 depicts an exploded perspective view of a read head and a read head clamp according to an embodiment of the present invention.

FIG. 5 depicts a top view of a read head clamp with cantilevered clamping arms spread apart, according to an embodiment of the present invention.

DESCRIPTION OF THE PREFERRED EMBODIMENTS

Figure 1:
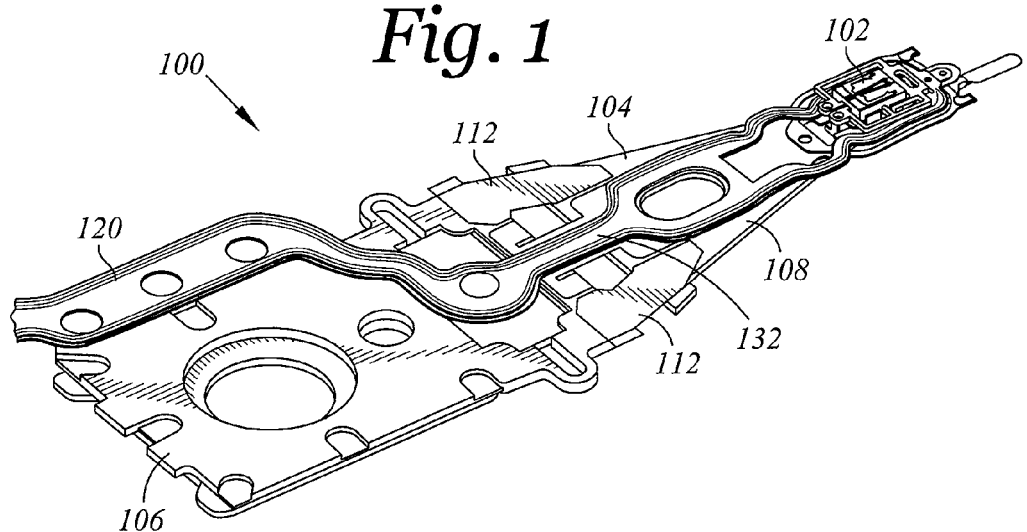
FIG. 1 depicts a perspective view of a head gimbal assembly (HGA) including a suspension assembly according to an embodiment of the present invention.

FIG. 1 depicts a perspective view of a head gimbal assembly (HGA) 100 including a read head 102 and a suspension assembly 104 according to an embodiment of the present invention. The suspension assembly 104 holds the read head 102 and provides a plurality of electrical connections thereto, the details of which will be described herein. The suspension assembly 104 includes a suspension mounting plate 106, and a load beam 108 attached to the suspension mounting plate 106 (for example via hinge plates 112). The load beam 108 may comprise stainless steel, for example. The suspension assembly 104 also includes a laminated flexure 120 that defines a body region 132.

Figure 2:
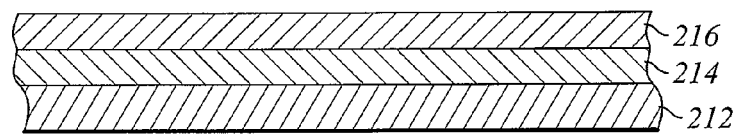
FIG. 2 depicts a cross-sectional side view of a portion of a laminated flexure in the HGA of FIG. 1.

FIG. 2 depicts a cross-sectional side view of a portion of a laminated flexure 120 in the HGA 100 of FIG. 1. Referring now additionally to FIG. 2, the laminated flexure 120 comprises a structural layer 212, a conductive layer 216, and a dielectric layer 214 disposed between the structural layer 212 and the conductive layer 216. For example, the dielectric layer 214 may comprise polyimide, the structural layer 212 may comprise stainless steel, and the conductive layer 216 may comprise copper.

Figure 3:
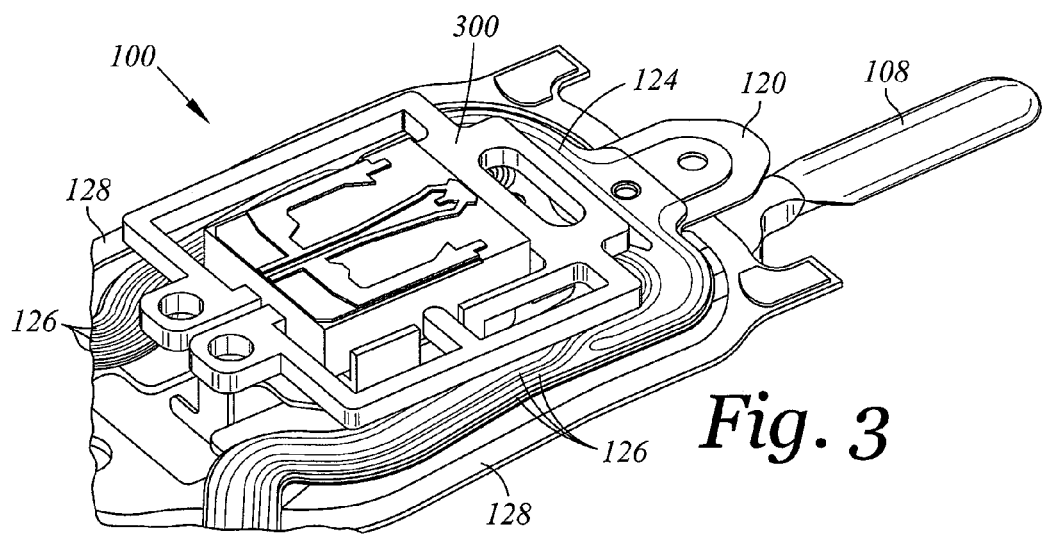
FIG. 3 depicts a portion of the HGA of FIG. 1.

FIG. 3 depicts a portion of the HGA 100 of FIG. 1. Referring now additionally to FIG. 3, the laminated flexure 120 also defines a tongue region 124, and at least two flexure beams 128. The tongue region 124 defines a flexure plane, and the body region 132 is connected to the tongue region 124 by the flexure beams 128. The structural layer 212 is attached to the load beam 108 in the body region 132, and a plurality of conductive traces 126 is defined in the conductive layer 216. The suspension assembly 104 also includes a read head clamp 300 attached to the tongue region 124 of the laminated flexure 120. Preferably, the read head clamp 300 comprises a material that has a high yield strength to facilitate flexing without yielding, and has a high fatigue life. For example, the read head clamp 300 may comprise high grade stainless steel or beryllium copper.

FIG. 4 depicts an exploded perspective view of the read head 102 and the read head clamp 300. FIG. 5 depicts a top view of the read head clamp 300 in a temporarily deformed state. Referring now additionally to FIGS. 4-5, the read head clamp 300 includes a first cantilevered clamping arm 310. The first cantilevered clamping arm 310 has a first arm supported end 312 and a first arm distal end 314. As can be seen in FIG. 4, the first cantilevered clamping arm 310 is sized so that the first arm distal end 314 is positioned to contact a leading face 402 of the read head 102. The read head clamp 300 also includes a wall 350 that is positioned to face a trailing face 404 of the read head 102.

In the embodiment of FIGS. 4-5, the read head clamp 300 further comprises a second cantilevered clamping arm 330 having a second arm supported end 332 and a second arm distal end 334. Note that the second arm distal end 334 is not attached to the first arm distal end 314. FIG. 4 shows that the second cantilevered clamping arm 330 may be sized so that the second arm distal end 334 is positioned to contact the leading face 402 of the read head 102.

In the embodiment of FIGS. 4-5, the first and second distal ends 314, 334 include first and second tooling holes 316, 336, respectively. The tooling holes 316, 336 may be used to open the read head clamp 300 to facilitate placing the read head 102 within the read head clamp. For example, first and second tooling pins may be inserted into the first and second tooling holes 316, 336, respectively. The first and second tooling pins 316, 336 then may be spread apart from the clamp center and from each other, to cause relative translation T of the distal ends 314, 334 away from the clamp center and away from each other, as shown in FIG. 5.

The translation T is shown in FIG. 5 to be in a direction that would be substantially parallel to the flexure plane of the tongue region of a supporting HGA (though the HGA is not shown in FIG. 4). Specifically, each of the arm distal ends 314, 334 in the embodiment of FIG. 5 is moveable through an arc that is substantially parallel to the flexure plane, because each of the cantilevered clamping arms 310, 330 is flexible in a direction parallel to the flexure plane. Such in-plane translation may be particularly advantageous where the read head clamp 300 is designed to clamp small form-factor read heads, since the height of small read heads does not provide much room or clearance for the operation of the read head clamp. For example, a so-called "pico" form factor read head has a height of 300 microns, while so-called "femto" and "pemto" form factor read heads have a height of only 230 microns.

With the distal ends 314, 334 spread apart from the clamp center and from each other as shown in FIG. 5, a read head (e.g. read head 102) can be more easily placed between the first and second cantilevered clamping arms 310, 330. The first and second tooling pins may then be removed from the first and second tooling holes 316, 336, respectively. This allows pushing surfaces 352, 354 of the first and second distal ends 314, 334 to contact and push against the leading face 402 of the read head 102, which in turn, pushes the trailing face 404 of the read head into contact with a plurality of flexure probes (not shown in FIGS. 4-5). Preferably, the first and second cantilevered clamping arms 310, 330 together apply a clamping force to the trailing face 404 of the read head 102 that is greater than 10 grams force.

It is contemplated that the first and second tooling pins may be again translated substantially parallel to the flexure plane, after placing the read head 102 but before removing the first and second tooling pins from the first and second tooling holes 316, 336, respectively. In certain embodiments such a translation prior to pin removal may be desirable because if the tooling pins are simply removed while the cantilevered arms 310, 330 of the read head clamp 300 are substantially deformed, the cantilevered arms 310, 330 may snap back to a less deformed position too violently. Note that removal of the tooling pins from the tooling holes 316, 336 also allows an optional lateral registration pin 318 to push against a first side face 406 of the read head 102, so that an opposing second side face 408 of the read head 102 will contact a lateral registration surface 320 of the read head clamp 300.

While the read head 102 is positioned and clamped in the read head clamp 300, the HGA may be used to facilitate testing of the read head 102 (e.g. dynamic electrical test). Then, after such testing is complete, the first and second tooling pins may be re-inserted into the first and second tooling holes, respectively, and then translated substantially parallel to the flexure plane to facilitate removal of the read head 102 from the read head clamp 300.

Figure 6A:
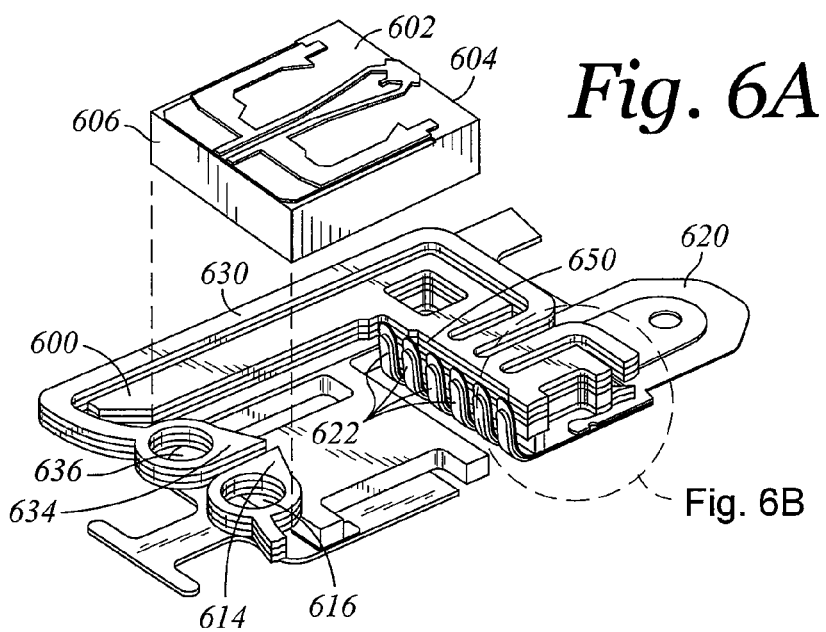
FIG. 6A depicts an exploded perspective and cross sectional view of a read head, read head clamp, and laminated flexure, according to an embodiment of the present invention.

FIG. 6A depicts an exploded perspective cut-away view of a read head 602, a read head clamp 600, and a laminated flexure 620, according to an embodiment of the present invention. The read head 602 includes a trailing face 604 and an opposing leading face 606. In the embodiment of FIG. 6A, the read head clamp 600 is shown to have been fabricated as a laminate from a plurality of layers. The read head clamp 600 includes a second cantilevered arm 630 having a second distal end 634 with a second tooling hole 636. The read head clamp 600 also includes a first cantilevered arm (cut away in FIG. 6A) having a first distal end 614 with a first tooling hole 616. The read head clamp 600 also includes a wall 650 that is positioned to face the trailing face 604 of the read head 602.

Figure 6B:
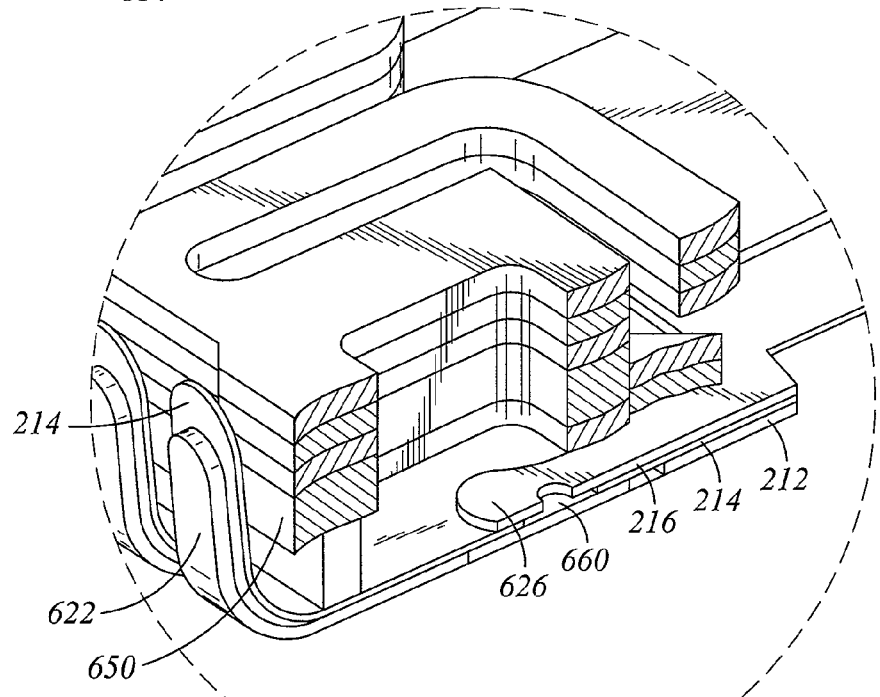
FIG. 6B depicts a magnified view of a portion of FIG. 6A.
Figure 6C:
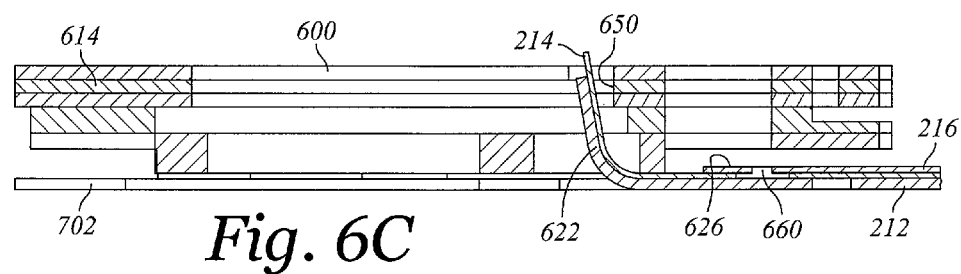
FIG. 6C depicts a side cross sectional view of a read head clamp and laminated flexure, according to an embodiment of the present invention.

FIG. 6B depicts a magnified view of a portion of FIG. 6A, and FIG. 6C depicts a side cross sectional view of the read head clamp 600 and laminated flexure 620 of FIGS. 6A-B. The laminated flexure 620 of FIGS. 6A-C, like the laminated flexure depicted in FIG. 2, includes a structural layer 212, a conductive layer 216, and a dielectric layer 214 disposed between the structural layer 212 and the conductive layer 216. To give the drawings of FIGS. 6A-C an appropriate scale, only a portion of a tongue region of the laminated flexure 620 is shown (though the flexure 620 would actually extend further).

The laminated flexure 620 of FIGS. 6A-C includes a plurality of conductive probes 622 defined in its structural layer 212 (in the tongue region shown). The structural layer 212 may optionally comprise stainless steel with gold plating at the locations of the plurality of conductive probes 622. Each of the plurality of conductive probes 622 is electrically connected to a corresponding one of a plurality of conductive traces defined in the conductive layer 216 (similar to conductive traces 126 in FIG. 3) by a plurality of conductive vias through the dielectric layer 214. For example, FIG. 6B depicts a conductive probe 622 that is defined in the structural layer 212, and that is electrically connected to a corresponding conductive trace 626 (that is defined in the conductive layer 216) by a conductive via 660 through the dielectric layer 214. Note that in the embodiment of FIGS. 6A-C, the conductive probes 622 are bent out of the flexure plane, and are positioned to lie between the wall 650 and the trailing face 604 of the read head 602, and are positioned to contact the trailing face 604 of the read head 602.

Figure 7:
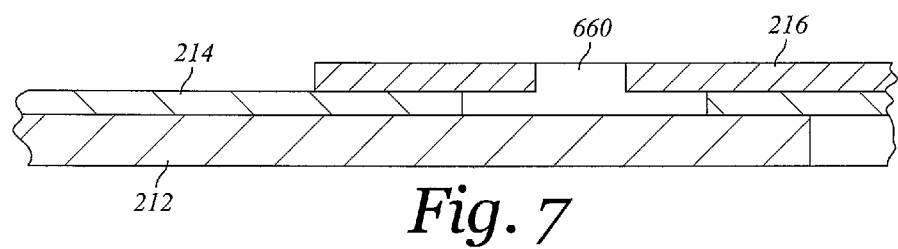
FIG. 7 depicts a cross-sectional side view of a portion of a laminated flexure, in an HGA according to an embodiment of the present invention.

FIG. 7 depicts a cross-sectional side view of a portion of a laminated flexure 620 in an HGA according to an embodiment of the present invention, to better illustrate one example geometry of the conductive via 660. The numerical labels in FIG. 7 follow those used in FIGS. 6A-C for easier understanding. Several alternative geometries for via 660 are also contemplated, including geometries where the hole in the dielectric layer 214 is the same size or larger than the hole in the conductive layer 216. Because the holes of via 660 may be created by masking during an additive or a subtractive process, the holes of via 660 need not be round. Electrical connection between the conductive layer 216 and the structural layer 212, may be made through the via 660 by forming the edges of the hole in the conductive layer 216 downward and/or by filling the via 660 with a conductive material (e.g. solder).

Figure 8A:
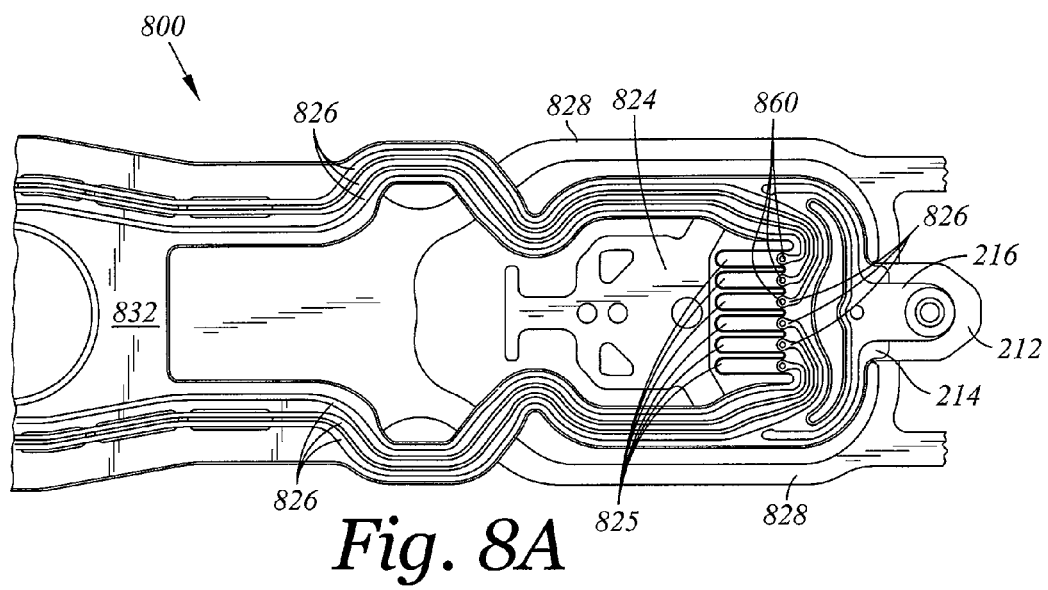
FIG. 8A depicts a top view of a laminated flexure sheet, in a flat configuration during assembly before bends are formed therein, according to an embodiment of the present invention.

FIG. 8A depicts a top view of a laminated flexure sheet 800, in a flat configuration during assembly before bends are formed therein, according to an embodiment of the present invention. The laminated flexure sheet 800 defines a body region 832 and a tongue region 824, and at least two flexure beams 828. The tongue region 824 defines a flexure plane (parallel to the plane of the drawing sheet that includes FIG. 8A), and the body region 832 is connected to the tongue region 824 by the flexure beams 828. The laminated flexure sheet 800 of FIG. 8A also includes a plurality of dielectric fingers 825 defined in its dielectric layer 214 in the tongue region 824. The plurality of dielectric fingers 825 serve to electrically isolate conductive probes from each other. The conductive probes are defined in the structural layer 212, and not seen in FIG. 8A because they are disposed on the opposite side of the dielectric fingers 825. A plurality of conductive vias 860 through the dielectric layer 214 provide electrical connection of the conductive probes to a corresponding ones of a plurality of conductive traces 826 defined in the conductive layer 216 of the laminated flexure sheet 800. Note that because bends have not yet been formed in the laminated flexure sheet 800 at the stage of fabrication depicted in FIG. 8A, the dielectric fingers 825 are not yet bent out of the flexure plane.

Figure 8B:
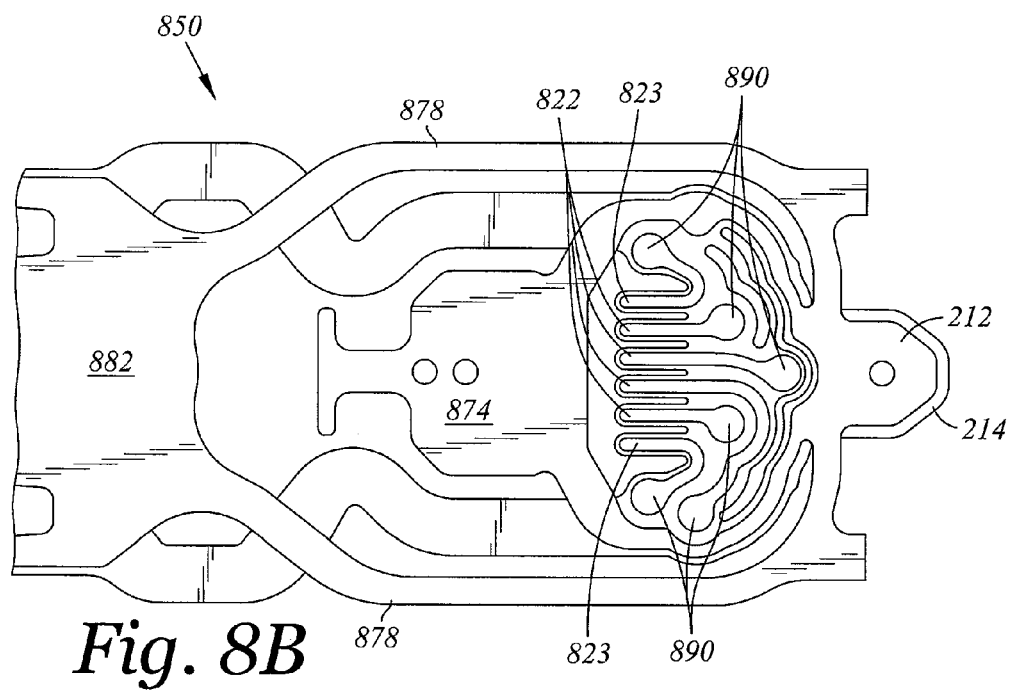
FIG. 8B depicts a bottom view of a laminated flexure sheet, in a flat configuration during assembly before bends are formed therein, according to an embodiment of the present invention that is similar but not identical to the embodiment of FIG. 8A.

FIG. 8B depicts a bottom view of a laminated flexure sheet 850, in a flat configuration during assembly before bends are formed therein, according to an embodiment of the present invention that is similar but not identical to the embodiment of FIG. 8A. The laminated flexure sheet 850 defines a body region 882 and a tongue region 874, and at least two flexure beams 878. The tongue region 874 defines a flexure plane (parallel to the plane of the drawing sheet that includes FIG. 8B), and the body region 882 is connected to the tongue region 874 by the flexure beams 878. The laminated flexure sheet 850 of FIG. 8B also includes a plurality of conductive probes 822, 823 defined in its structural layer 212 in the tongue region 874. The plurality of conductive probes 822, 823 includes inner probes 822 and first and second outer probes 823. Each of the plurality of conductive probes 822, 823 is electrically connected to a corresponding one of a plurality of conductive traces (not visible in FIG. 8B because on the other side of the dielectric layer 214) defined in a conductive layer of the laminated flexure sheet 850, by a plurality of conductive vias 890 through the dielectric layer 214. Note that because bends have not yet been formed in the laminated flexure sheet 850 at the stage of fabrication depicted in FIG. 8B, the conductive probes 822, 823 are not yet bent out of the flexure plane.

Figure 9:
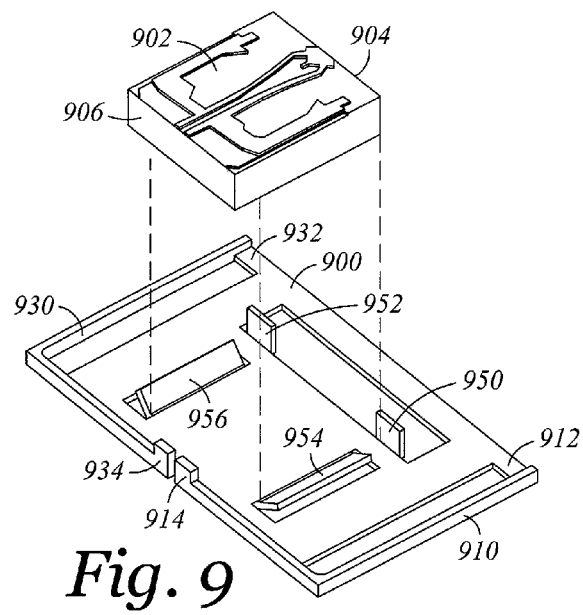
FIG. 9 depicts an exploded perspective view of a read head and a read head clamp according to an embodiment of the present invention.

FIG. 9 depicts an exploded perspective view of a read head 902 and a read head clamp 900 according to an embodiment of the present invention. The read head clamp 900 includes a first cantilevered clamping arm 910 that has a first arm supported end 912 and a first arm distal end 914. The first cantilevered clamping arm 910 is sized so that the first arm distal end 914 is positioned to contact a leading face 906 of the read head 902. The read head clamp 900 also includes a first wall 950 and a second wall 952, each positioned to face a trailing face 904 of the read head 902. The read head clamp 900 also optionally includes lateral positioning ramps 954, 956 that may contact outer edges of the read head 902, for example to help laterally align the position of the read head 902.

Figure 10:
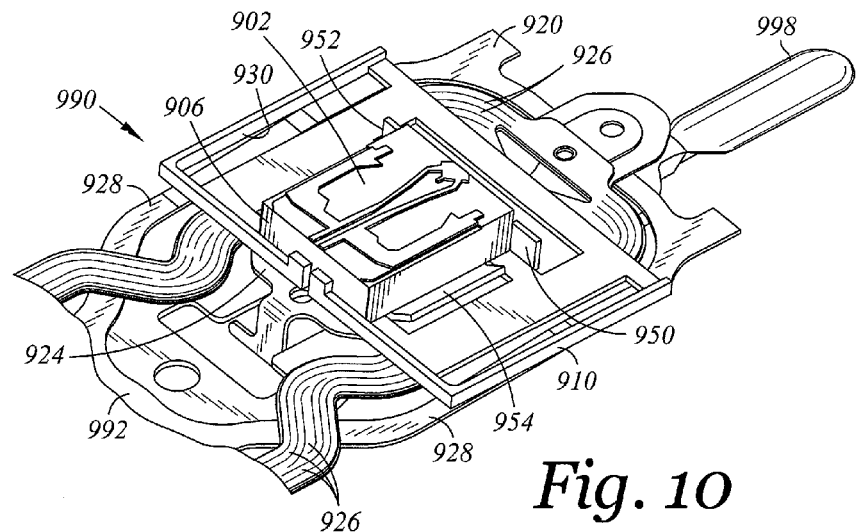
FIG. 10 depicts a perspective view of the read head and read head clamp of FIG. 9, in position on an example HGA.

In the embodiment of FIG. 9, the read head clamp 900 further comprises a second cantilevered clamping arm 930 having a second arm supported end 932 and a second arm distal end 934. Note that the second arm distal end 934 is not attached to the first arm distal end 914. FIGS. 9-10 show that the second cantilevered clamping arm 930 may be sized so that the second arm distal end 934 is positioned to contact the leading face 906 of the read head 902.

FIG. 10 depicts a perspective view of the read head 902 and read head clamp 900 of FIG. 9, in position on an example HGA 990. The HGA 990 includes a laminated flexure 920 that defines a tongue region 924, and at least two flexure beams 928. The tongue region 924 defines a flexure plane, and the tongue region 924 is connected to a body region 992 of the laminated flexure 920 by the flexure beams 928. The HGA 990 of FIG. 10 also includes a load beam 998. A structural layer (e.g. like structural layer 212 of FIG. 2) of the laminated flexure 920 is attached to the load beam 998 in the body region 992, and a plurality of conductive traces 926 is defined in a conductive layer (e.g. like conductive layer 216 of FIG. 2) of the laminated flexure 920. As shown in FIG. 10, the read head clamp 900 is attached to the tongue region 924 of the laminated flexure 920 of the HGA 990.

As shown in FIG. 10, with the read head 902 in position with and being clamped by the read head clamp 900, the distal ends 914, 934 are contacting and pushing on the leading face 906 of the read head 902. In counteraction of this pushing force, the trailing face 904 of the read head 902 is in contact with and presses against the first and second walls 950, 952 of the read head clamp 900. Also in counteraction of the pushing force from the distal ends 914, 934, there is some pressure between the trailing face 904 and a plurality of conductive probes that contact the trailing face 904. Note that the conductive probes are not shown in FIG. 10, but they are similar to the conductive probes 622 shown in FIG. 6A, and they contact the trailing face 904 between the first and second walls 950, 952.

However, the first and second walls 950, 952 serve to limit the translation of the read head 902, so that increasing the pushing force from the distal ends 914, 934 (e.g. to better clamp the read head 902) will not cause the conductive probes to flex further and potentially excessively. Hence, the action of the first and second walls 950, 952 reduces or eliminates the risk that the conductive probes may undesirably yield. That is, in the embodiment of FIGS. 9-10, the first and second walls 950, 952, allow the clamping force from the distal ends 914, 934 to be advantageously increased beyond the force that could be countered by the resiliency of the conductive probes alone, and/or advantageously decrease the risk that the conductive probes might undesirably yield.

Figure 11:
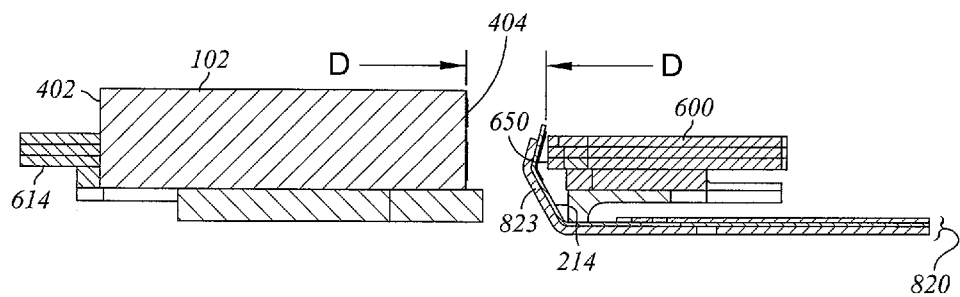
FIG. 11 depicts a side cross sectional view of a read head, read head clamp, and laminated flexure, during assembly before clamping is complete, according to an embodiment of the present invention.

FIG. 11 depicts a side cross sectional view of a read head 102, read head clamp 600, and laminated flexure 820, during assembly before clamping is complete, according to an embodiment of the present invention. The numerical labels used in FIG. 11 are consistent with earlier use herein. For example, the flexure 820 may be fabricated from the flexure sheet 800 shown in FIG. 8, except with the conductive probes 822 and 823 having been formed to include bends out of the flexure plane. Also for example, the read head clamp 600 may be of the design shown earlier in FIG. 6A.

As can be seen in FIG. 11, the outer conductive probes 823 may be positioned to lie (or be sandwiched) between the wall 650 and the trailing face 404 of the read head 102. Likewise, the inner conductive probes (e.g. probes 822 of FIG. 8) may be similarly bent and so positioned. Hence, with the read head 102 being held by the read head clamp 600 (i.e. when the distal end 614 of the read head clamp 600 forces the distance D to go to zero), the outer conductive probes 823 will contact the trailing face 404 of the read head 102, with the dielectric layer 214 (of the laminated flexure 820) on their opposite side contacting the wall 650. By contrast, the wall 650 may include a central recess so that the inner conductive probes (e.g. probes 822 of FIG. 8) contact the trailing face 404 of the read head 102 without the dielectric layer 214 on their opposite side contacting the wall 650.

Hence, in the embodiment of FIG. 11, the outer conductive probes (e.g. conductive probe 823) get back-up support from the wall 650 to help counteract the pushing force of the distal end 614 after the distance D goes to zero. That is, the distal ends (including distal end 614) of the read head clamp 650 contact and push against the leading face 402 of the read head 102 with sufficient clamping force to deflect the plurality of flexure probes until head-facing sides of the outermost flexure probes 823 contact the trailing face 404 of the read head 102, while opposite-facing sides of the outermost flexure probes 823 contact the wall 650.

In this way, the wall 650 serves to limit the translation of the read head 102, so that increasing the pushing force from the distal end 614 (e.g. to better clamp the read head 102) will not cause the inner (or outer) conductive probes to flex further or excessively. Hence, the action of the wall 650 can reduce or eliminate the risk that the conductive probes may undesirably yield. That is, in the embodiment of FIG. 11, the wall 650 may advantageously allow the clamping force from the distal end 614 to be increased beyond the force that could be elastically countered by the bending resiliency of the conductive probes alone, and/or may decrease the risk that the conductive probes might undesirably yield.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

We claim:

1. A suspension assembly for holding a read head and providing a plurality of electrical connections thereto, the suspension assembly comprising:

a suspension mounting plate;

a load beam attached to the suspension mounting plate;

a laminated flexure comprising a structural layer, a conductive layer, and a dielectric layer disposed between the structural and conductive layers, wherein the laminated flexure defines a body region, a tongue region, and at least two flexure beams, the tongue region defining a flexure plane, the body region being connected to the tongue region by the at least two flexure beams, the structural layer being attached to the load beam in the body region, and a plurality of conductive traces being defined in the conductive layer;

a read head clamp attached to the tongue region of the laminated flexure, the read head clamp including a first cantilevered clamping arm that has a first arm supported end and a first arm distal end, the first cantilevered clamping arm being sized so that the first arm distal end is positioned to contact a leading face of the read head; and a first wall positioned to face a trailing face of the read head;

wherein the laminated flexure includes a plurality of conductive probes defined in the structural layer in the tongue region, each of the plurality of conductive probes being electrically connected to a corresponding one of the plurality of conductive traces by a plurality of conductive vias through the dielectric layer, and wherein each of the plurality of conductive probes is bent out of the flexure plane and is positioned to contact the trailing face of the read head.

2. The suspension assembly of claim 1 wherein the first cantilevered clamping arm is flexible in a direction parallel to the flexure plane so that the first arm distal end is moveable through an arc that is substantially parallel to the flexure plane.

3. The suspension assembly of claim 2 wherein the read head clamp further comprises a second cantilevered clamping arm having a second arm supported end and a second arm distal end, the second arm distal end not being attached to the first arm distal end, the second cantilevered clamping arm being sized so that the second arm distal end is positioned to contact the leading face of the read head.

4. The suspension assembly of claim 3 wherein the second cantilevered clamping arm is flexible in a direction parallel to the flexure plane so that the second arm distal end is moveable through an arc that is substantially parallel to the flexure plane.

5. The suspension assembly of claim 3 wherein the first and second cantilevered clamping arms are sized and positioned so that, with the read head being held by the read head clamp, the first and second cantilevered clamping arms together apply a clamping force to the read head that is greater than 10 grams force.

6. The suspension assembly of claim 1 wherein the dielectric layer comprises polyimide, the structural layer comprises stainless steel, the conductive layer comprises copper, and the load beam comprises stainless steel.

7. The suspension assembly of claim 6 wherein the structural layer includes gold plating on the stainless steel at the plurality of conductive probes.

8. The suspension assembly of claim 1 wherein at least one of the plurality of conductive probes is positioned to lie between the first wall and the trailing face of the read head.

9. The suspension assembly of claim 8 wherein the at least one of the plurality of conductive probes is a first outermost probe, and wherein the plurality of conductive probes also includes a second outermost probe, and wherein the read head clamp further includes a second wall positioned to face a trailing face of the read head, and wherein the second outermost probe is positioned to lie between the second wall and the trailing face of the read head.

10. The suspension assembly of claim 9 wherein the first and second outermost probes are positioned so that, with the read head being held by the read head clamp, the first and second outermost probes will contact the trailing face of the read head, with the dielectric layer of the laminated flexure contacting the first wall.

11. The suspension assembly of claim 1 wherein the read head clamp comprises beryllium copper.

12. A method for temporarily holding a read head and providing a plurality of electrical connections thereto, the method comprising:

providing a suspension assembly having a flexure tongue and a read head clamp attached to the flexure tongue, the flexure tongue defining a flexure plane and including a plurality of flexure probes bent out of the flexure plane, the read head clamp including a first wall, the read head clamp further including first and second cantilevered clamping arms having first and second distal ends, respectively, the first and second distal ends including first and second tooling holes, respectively;

inserting first and second tooling pins in the first and second tooling holes, respectively;

spreading the first and second tooling pins apart from each other, by relative translation that is substantially parallel to the flexure plane;

placing the read head between the first and second cantilevered clamping arms;

removing the first and second tooling pins from the first and second tooling holes, respectively, allowing the first and second distal ends to contact and push against a leading face of the read head, the trailing face of the read head contacting the plurality of flexure probes.

13. The method of claim 12 wherein a first outermost flexure probe of the plurality of flexure probes is sandwiched between the trailing face of the read head and the first wall.

14. The method of claim 13 wherein the first and second distal ends contact and push against the leading face of the read head with sufficient clamping force to deflect the plurality of flexure probes until a head-facing side of the first outermost flexure probe contacts the trailing face of the read head, while an opposite-facing side of the first outermost flexure probe contacts the first wall.

15. The method of claim 13 wherein the read head clamp further comprises a second wall and wherein a second outermost flexure probe of the plurality of flexure probes is sandwiched between the trailing face of the read head and the second wall, and wherein the first and second distal ends contact and push against the leading face of the read head with sufficient clamping force to deflect the plurality of flexure probes until a head-facing side of the second outermost flexure probe contacts the trailing face of the read head, while an opposite-facing side of the second outermost flexure probe contacts the second wall.

16. The method of claim 12 further comprising again translating the first and second tooling pins substantially parallel to the flexure plane, after placing the read head but before removing the first and second tooling pins from the first and second tooling holes, respectively.

17. The method of claim 12 further comprising testing the read head while it is clamped in the read head clamp, and then removing the read head from the read head clamp.

18. The method of claim 17 wherein the testing includes a dynamic electrical test.

19. The method of claim 17 wherein removing the read head from the read head clamp comprises re-inserting the first and second tooling pins into the first and second tooling holes, respectively, and again translating the first and second tooling pins substantially parallel to the flexure plane.

* * * * *